(12) United States Patent
Gao

(10) Patent No.: US 11,714,645 B2
(45) Date of Patent: Aug. 1, 2023

(54) WRITE CACHE CIRCUIT, DATA WRITE METHOD, AND MEMORY

(71) Applicant: CHANGXIN MEMORY TECHNOLOGIES, INC., Hefei (CN)

(72) Inventor: Enpeng Gao, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 18/149,247

(22) Filed: Jan. 3, 2023

(65) Prior Publication Data

US 2023/0141139 A1    May 11, 2023

Related U.S. Application Data

(63) Continuation of application No. PCT/CN2022/001171, filed on Jun. 24, 2022.

(30) Foreign Application Priority Data

Oct. 18, 2021 (CN) .......................... 202111210536.2

(51) Int. Cl.
*G06F 9/00* (2006.01)
*G06F 9/30* (2018.01)
*G06F 12/0802* (2016.01)

(52) U.S. Cl.
CPC ...... *G06F 9/30047* (2013.01); *G06F 9/30018* (2013.01); *G06F 9/30032* (2013.01); *G06F 12/0802* (2013.01); *G06F 2212/283* (2013.01)

(58) Field of Classification Search
CPC ............. G06F 9/30047; G06F 12/0802; G06F 2212/283
See application file for complete search history.

(56) References Cited

U.S. PATENT DOCUMENTS

| 10,535,388 B1 | 1/2020 | Ingalls |
| 11,243,767 B2 | 2/2022 | Tang et al. |

(Continued)

FOREIGN PATENT DOCUMENTS

| CN | 101840383 A | 9/2010 |
| CN | 104375946 A | 2/2015 |

(Continued)

OTHER PUBLICATIONS

International Search Report cited in PCT/CN2022/101171 dated Sep. 8, 2022, 17 pages.

*Primary Examiner* — Jae U Yu
(74) *Attorney, Agent, or Firm* — Cooper Legal Group, LLC

(57) ABSTRACT

The present disclosure provides a write cache circuit, a data write method, and a memory. The write cache circuit includes: a control circuit configured to generate, on the basis of a mask write instruction, a first write pointer and a pointer to be positioned, generate a second write pointer on the basis of a write command, generate a first output pointer on the basis of a mask write shift instruction, and generate a second output pointer on the basis of a write shift instruction; a first cache circuit configured to cache, on the basis of the first write pointer, the pointer to be positioned and output a positioned pointer on the basis of the first output pointer, the positioned pointer being configured to instruct a second cache circuit to output a write address written by the second write pointer generated according to the mask write instruction.

19 Claims, 3 Drawing Sheets

(56) References Cited

U.S. PATENT DOCUMENTS

2003/0056060 A1   3/2003  Hertz et al.
2003/0088694 A1*  5/2003  Patek ...................... H04L 49/30
                                                                709/238

FOREIGN PATENT DOCUMENTS

CN    104461964 A    3/2015
CN    113326020 A    8/2021
WO    2019010703 A1  1/2019

* cited by examiner

WRITE CACHE CIRCUIT, DATA WRITE METHOD, AND MEMORY

CROSS-REFERENCE TO RELATED APPLICATIONS

This is a continuation of International Application No. PCT/CN2022/101171, filed on Jun. 24, 2022, which claims the priority to Chinese Patent Application No. 202111210536.2, titled "WRITE CACHE CIRCUIT, DATA WRITE METHOD, AND MEMORY" and filed on Oct. 18, 2021. The entire contents of International Application No. PCT/CN2022/101171 and Chinese Patent Application No. 202111210536.2 are incorporated herein by reference.

TECHNICAL FIELD

The present disclosure relates to, but is not limited to, a write cache circuit, a data write method, and a memory.

BACKGROUND

In the process of writing data into the memory, it is necessary to ensure that the timing of acquiring a write address is consistent with the timing of a write operation, such that the data write operation can be implemented. Usually, the acquired write address is stored into a memory cell, and then the timing of acquiring the write address from the memory cell is set to be consistent with the timing of the write operation, to ensure that the timing of acquiring the write address is consistent with the timing of the write operation.

However, data write of the memory includes multiple write modes, such as a direct write operation and a mask write operation. The direct write operation is to write data successively according to the write address. The mask write operation is to write data selectively according to the write address, and data is not written into an unselected address.

For different write modes, different memory cells are configured to store the write address, to ensure that the different write modes operate independently of each other and do not affect each other. However, the different write modes require different memory cells, thereby greatly increasing the area of a write circuit of the memory, which does not conform to the current development trend of the memory.

SUMMARY

An overview of the subject described in detail in the present disclosure is provided below. This overview is not intended to limit the protection scope of the claims.

The present disclosure provides a write cache circuit, a data write method, and a memory.

A first aspect of the present disclosure provides a write cache circuit, including: a control circuit configured to generate, on the basis of a mask write instruction, a first write pointer and a pointer to be positioned, generate a second write pointer on the basis of a write command, generate a first output pointer on the basis of a mask write shift instruction, and generate a second output pointer on the basis of a write shift instruction; where, the write command is one of a write instruction and the mask write instruction, and the pointer to be positioned and the second write pointer generated on the basis of the mask write instruction correspond to a same write address; a first cache circuit configured to cache data in a queue, cache, on the basis of the first write pointer, the pointer to be positioned, and output a positioned pointer on the basis of the first output pointer; where, the positioned pointer is the pointer to be positioned that is cached in the first cache circuit, and is configured to instruct the second cache circuit to output the write address written by the second write pointer generated according to the mask write instruction; and a second cache circuit configured to cache the data in a queue, cache the write address on the basis of the second write pointer, and output the cached write address on the basis of the second output pointer or the positioned pointer.

A second aspect of the present disclosure provides a data write method, applied to the write cache circuit according to the first aspect. The data write method includes: writing, on the basis of a write command, a write address corresponding to the write command into a second cache circuit, the write command being one of a write instruction and a mask write instruction; writing, on the basis of the mask write instruction, a pointer to be positioned into a first cache circuit, the pointer to be positioned being configured to give an instruction of writing the write address of the second cache circuit on the basis of the mask write instruction; and successively reading, on the basis of a write shift instruction, the write address stored in the second cache circuit, or selectively reading, on the basis of a mask write shift instruction, the write address stored in the second cache circuit through the pointer to be positioned in the first cache circuit.

A third aspect of the present disclosure provides a memory, including the write cache circuit according to the first aspect.

Other aspects of the present disclosure are understandable upon reading and understanding of the accompanying drawings and detailed description.

BRIEF DESCRIPTION OF THE DRAWINGS

The accompanying drawings incorporated into the specification and constituting a part of the specification illustrate the embodiments of the present disclosure, and are used together with the description to explain the principles of the embodiments of the present disclosure. In these accompanying drawings, similar reference numerals represent similar elements. The accompanying drawings in the following description illustrate some rather than all of the embodiments of the present disclosure. Those skilled in the art may obtain other accompanying drawings based on these accompanying drawings without creative efforts.

DETAILED DESCRIPTION

The technical solutions in the embodiments of the present disclosure are described below clearly and completely with reference to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts should fall within the protection scope of the present disclosure. It should be noted that the embodiments in the present disclosure and features in the embodiments may be combined with each other in a non-conflicting manner.

For different write modes, different memory cells are configured to store the write address, to ensure that the different write modes operate independently of each other and do not affect each other. However, the different write modes require different memory cells, thereby greatly increasing the area of a memory write circuit, which does not conform to the current development trend of the memory.

One embodiment of the present disclosure provides a write cache circuit for integrating a write address storage space required by the write operation and the mask write operation to reduce the layout area of a write circuit in practical applications.

Those of ordinary skill in the art should understand that many technical details are proposed in the embodiments of the present disclosure to make the present disclosure better understood. However, even without these technical details and various changes and modifications made based on the following embodiments, the technical solutions claimed in the present disclosure may still be realized.

Figure 1:
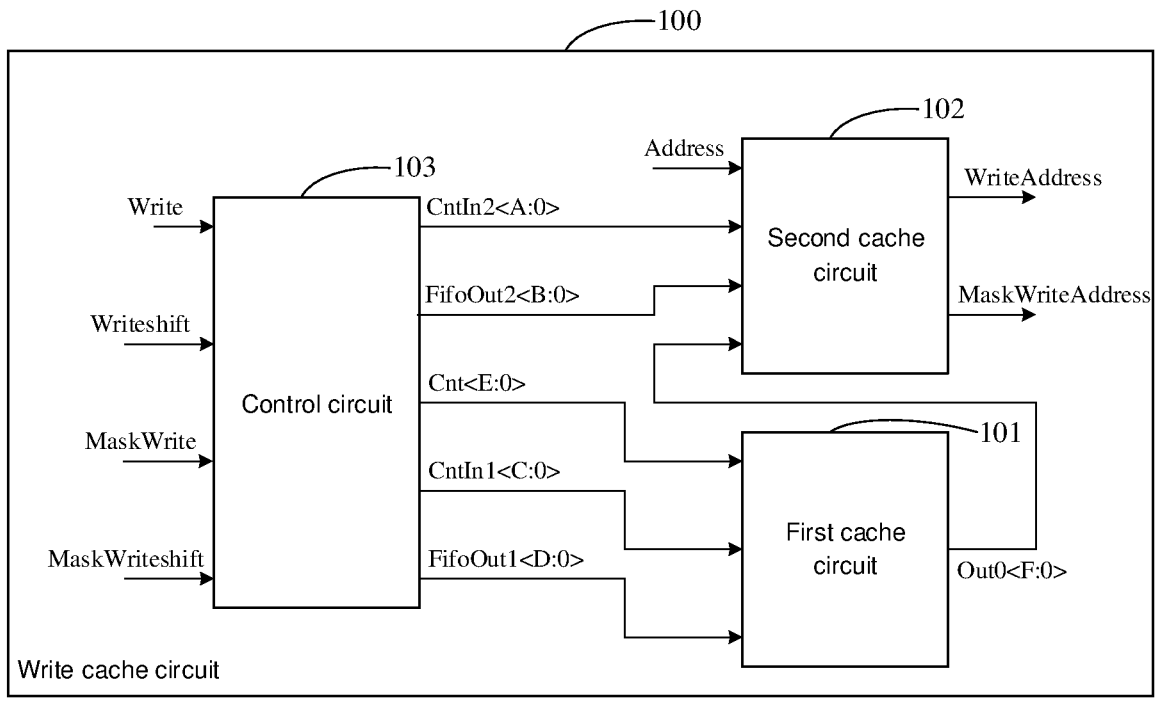
FIG. 1 to FIG. 3 are schematic structural diagrams of a write cache circuit according to one embodiment of the present disclosure.
Figure 2:
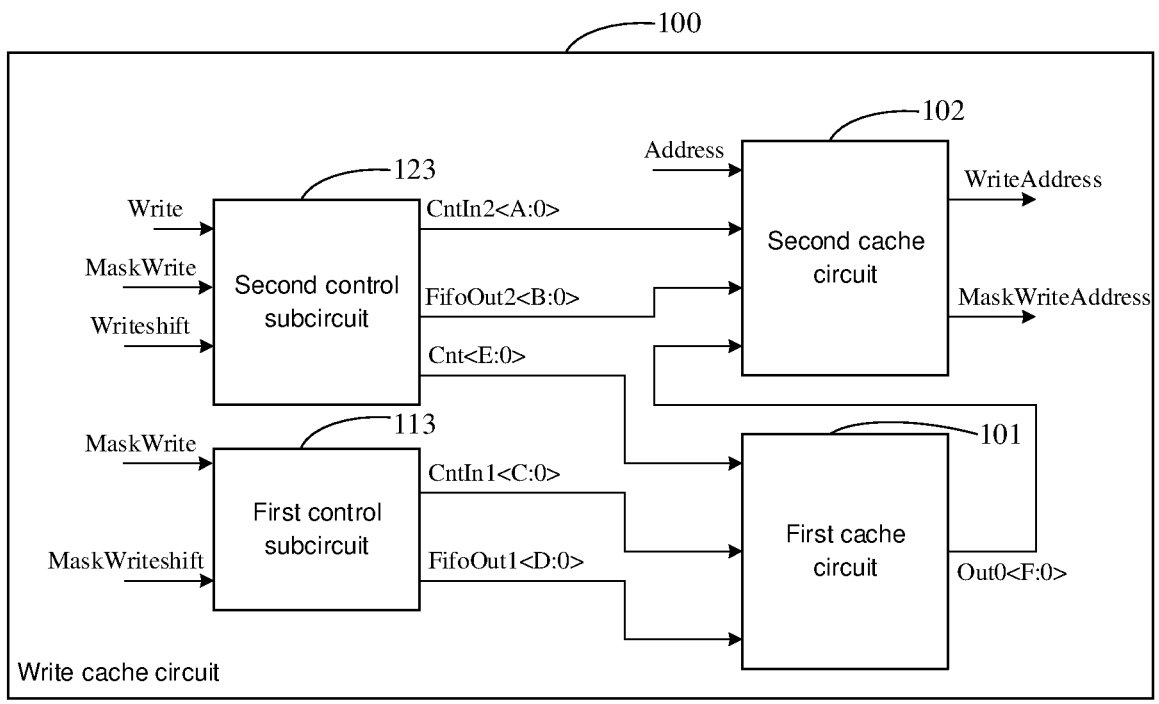
Figure 3:
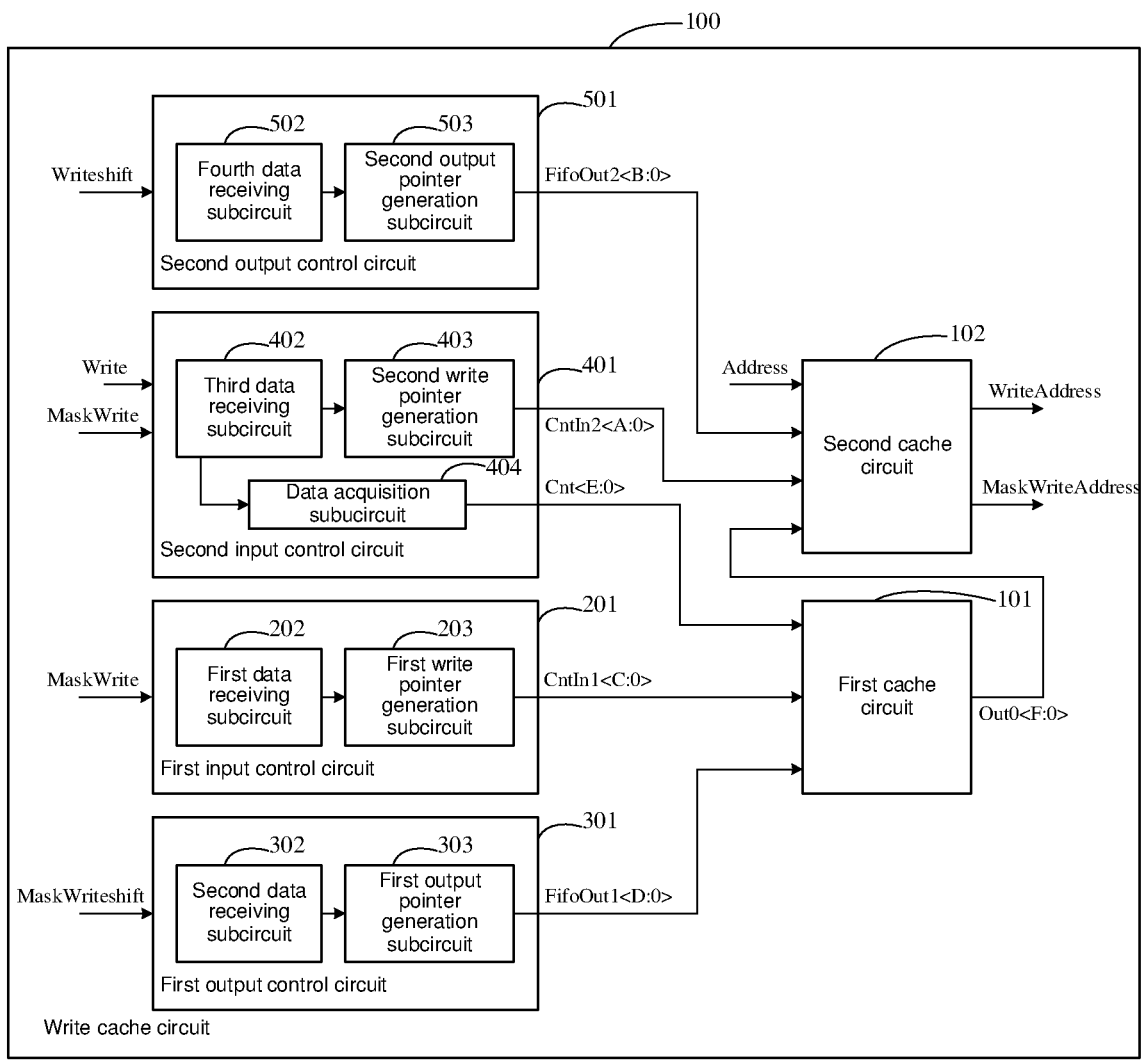
Figure 4:
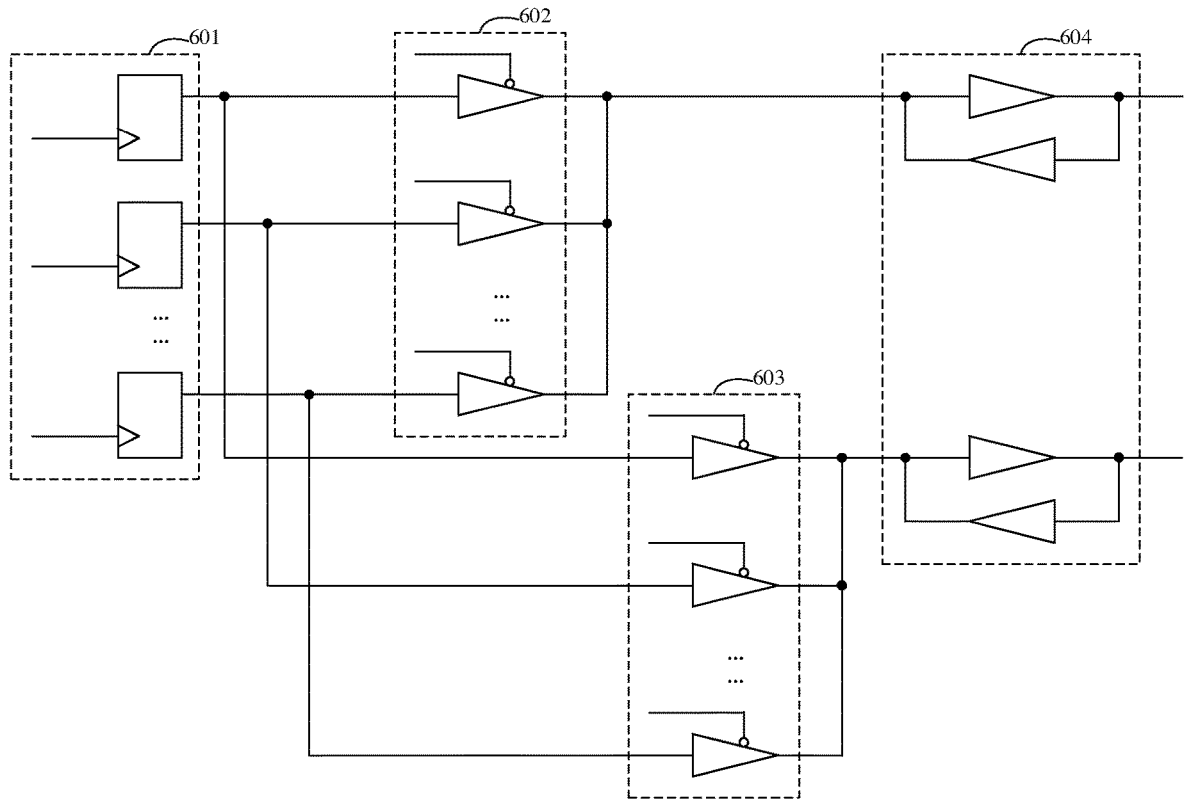
FIG. 4 is a schematic receiving diagram of a second cache circuit according to one embodiment of the present disclosure.
Figure 5:
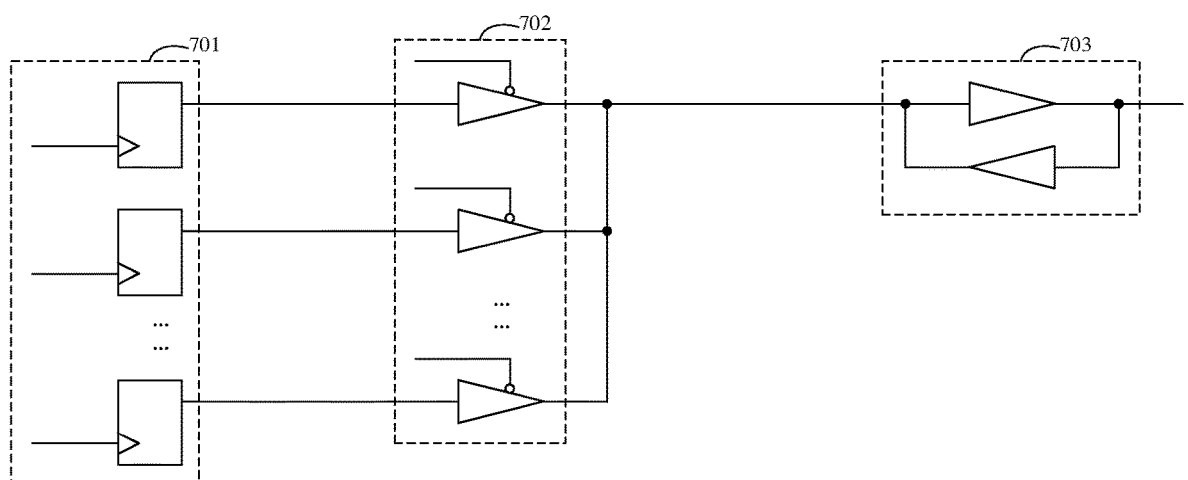
FIG. 5 is a schematic receiving diagram of a first cache circuit according to one embodiment of the present disclosure.

FIG. 1 to FIG. 3 are schematic structural diagrams of a write cache circuit according to this embodiment, FIG. 4 is a schematic receiving diagram of a second cache circuit according to this embodiment, and FIG. 5 is a schematic receiving diagram of a first cache circuit according to this embodiment. The write cache circuit provided in this embodiment is further described below in detail with reference to the accompanying drawings, and the details are as follows:

Referring to FIG. 1, the write cache circuit 100 includes a first cache circuit 101, a second cache circuit 102, and a control circuit 103. The second cache circuit 102 is configured to store data addresses. The first cache circuit 101 is configured to store pointers.

The control circuit 103 is configured to generate, on the basis of a mask write instruction MaskWrite, a first write pointer CntIn1<C:0> and a pointer to be positioned Cnt<E:0>, generate a second write pointer CntIn2<A:0> on the basis of a write command, generate a first output pointer FifoOut1<D:0> on the basis of a mask write shift instruction MaskWriteShift, and generate a second output pointer FifoOut2<B:0> on the basis of a write shift instruction WriteShift.

The write command is one of a write instruction Write and the mask write instruction MaskWrite. That is, the write command includes the write instruction Write and the mask write instruction MaskWrite. That is, whether the write instruction Write or the mask write instruction MaskWrite is received, the control circuit 103 may generate the second write pointer CntIn2<A:0>, and the pointer to be positioned Cnt<E:0> and the second write pointer CntIn2<A:0> generated on the basis of the mask write instruction correspond to a same write address Address.

For the features mentioned above, the write instruction Write and the mask write instruction MaskWrite are configured to cache the corresponding write address Address, and the write shift instruction WriteShift and the mask write shift instruction MaskWriteShift are configured to output the cached write address Address, such that the memory completes the data write on the basis of the write address Address.

The second write pointer CntIn2<A:0> is configured to indicate a storage space of the write address Address required to write the write instruction Write and the mask write instruction MaskWrite. The second output pointer FifoOut2<B:0> is configured to indicate a storage space of the write address Address required to output the write shift instruction WriteShift. The first write pointer CntIn1<C:0> is configured to indicate a storage space of write pointers required by the mask write instruction MaskWrite. The first output pointer FifoOut1<D:0> is configured to indicate a storage space of output pointers required by the mask write shift instruction MaskWriteShift. The pointer written by the first write pointer CntIn1<C:0> is the pointer to be positioned Cnt<E:0>. The pointer outputted by the first output pointer FifoOut1<D:0> is the positioned pointer Out0<F:0>. The pointer to be positioned Cnt<E:0> is configured to indicate a storage space of the write address Address required to write the mask write instruction MaskWrite. The positioned pointer Out0<F:0> is configured to indicate a storage space of the write address Address where the mask write shift instruction MaskWriteShift is outputted.

The first cache circuit 101 is configured to cache the data in a queue, such as a first-in-first-out queue, cache, on the basis of the first write pointer CntIn1<C:0>, the pointer to be positioned Cnt<E:0>, and output the positioned pointer Out0<F:0> on the basis of the first output pointer FifoOut1<D:0>.

The positioned pointer Out0<F:0> is the pointer to be positioned Cnt<E:0> cached in the first cache circuit 101. That is, the data of the positioned pointer Out0<F:0> is the same as the data of the corresponding pointer to be positioned Cnt<E:0>. The positioned pointer Out0<F:0> is configured to instruct the second cache circuit 102 to output the write address Address written by the second write pointer CntIn2<A:0> generated according to the mask write instruction.

The second cache circuit 102 is configured to cache the data in a queue, such as a first-in-first-out queue, cache the write address Address on the basis of the second write pointer CntIn2<A:0>, and output the cached write address Address on the basis of the second output pointer FifoOut2<B:0> or the positioned pointer Out0<F:0>.

The address outputted on the basis of the write shift instruction WriteShift is a real write address WriteAddress, and the address outputted on the basis of the mask write shift instruction MaskWriteShift is a real mask write address MaskWriteAddress. The real write address WriteAddress and the real mask write address MaskWriteAddress are configured to indicate the write address of the memory.

It should be noted that the above "A", "B", "C", "D", "E", and "F" are configured to represent binary locations corresponding to each pointer. In specific applications, they may be set according to the type of the applied memory, and this embodiment does not constitute a limitation on this data.

It is assumed that the write instruction and the mask write instruction are inputted into the control circuit 103 at the same time to generate the second write pointer CntIn2<A:0>, and 8 pieces of address data are sequentially written into the second cache circuit, namely data 1, data 2, data 3, data 4, data 5, data 6, data 7, and data 8. It is continued to assume that data 1, data 3, and data 5 need to be written as masks. At this time, the second write pointer CntIn2<A:0> is configured to write data 1 to data 8 into the second cache circuit 102, and when writing data 1, data 3, and data 5, the pointer to be positioned Cnt<E:0> that indicates the same storage space as the second write pointer CntIn2<A:0> is generated. The first write pointer CntIn1<C:0> is configured to write the pointer to be positioned Cnt<E:0> into the first cache circuit 101.

When reading is performed on the basis of the write shift instruction WriteShift, the data cached in the second cache circuit 102, namely data 1 to data 8 are successively read on the basis of the second output pointer FifoOut2<B:0>. When reading is performed on the basis of the mask write shift instruction MaskWriteShift, the positioned pointer Out0<F:0> is read once on the basis of the first output pointer FifoOut1<D:0>, and then data 1, data 3 and data 5 are selectively read according to the positioned pointer.

According to the above analysis, regardless of whether it is the write operation or the mask write operation, the addresses needing to be cached are all stored in the second cache circuit 102, and the first cache circuit 101 is configured to store the locations of the addresses required for mask write in the second cache circuit 102. Compared with the way in which the write operation is independent of the mask write operation, the write cache circuit provided by the present disclosure saves one storage space by storing the data of the write operation and the data of the mask write operation into the storage space.

In addition, a location storage space configured to store the address corresponding to the mask write operation is newly added, and the number of data pieces stored in the location storage space is not greater than the number of data pieces configured to store the write address (the reason is that: the data stored in the write address includes write data and mask write data; in extreme cases, the write data are all the mask write data, and at this time, the number of data pieces stored in the location storage space is equal to the number of data pieces stored in the address storage space; while for a normal mask write operation, the number of pieces of mask write data is less than the number of pieces of written data, that is, the required location storage space is smaller than the required data storage space). That is, the capacity of the newly added storage space is smaller than the capacity of the saved storage space, thereby reducing the layout area of the write cache circuit in practical applications.

In one example, the first cache circuit 101 is shallower than the second cache circuit 102. By setting the number of data pieces stored in the location storage space to be smaller than the number of data pieces stored in the address storage space, the layout area of the write cache circuit in practical applications is reduced.

Referring to FIG. 2 and FIG. 1, in some embodiments, the control circuit 103 (referring to FIG. 1) includes a first control subcircuit 113 and a second control subcircuit 123.

The first control subcircuit 113 is configured to generate the first write pointer CntIn1<C:0> on the basis of the mask write instruction MaskWrite and generate the first output pointer FifoOut1<D:0> on the basis of the mask write shift instruction WriteShift. The second control subcircuit 123 is configured to generate the second write pointer CntIn2<A:0> on the basis of the write command, generate the second output pointer FifoOut2<B:0> on the basis of the write shift instruction WriteShift, and generate, on the basis of the mask write instruction MaskWrite, the pointer to be positioned Cnt<E:0>. That is, the first control subcircuit 113 is configured to control the first cache circuit 101 to store the pointer to be positioned Cnt<E:0>, and control the first cache circuit 101 to output the positioned pointer Out0<F:0>. The second control subcircuit 123 is configured to control the second cache circuit 102 to store the write address Address, and control the second cache circuit 102 to output the real write address WriteAddress or the real mask write address MaskWriteAddress.

Referring to FIG. 3 and FIG. 2, in some embodiments, the first control subcircuit 113 includes a first input control circuit 201 and a first output control circuit 301.

The first input control circuit 201 is configured to receive the mask write instruction MaskWrite and generate the first write pointer CntIn1<C:0> according to the mask write instruction MaskWrite. The first output control circuit 301 is configured to receive the mask write shift instruction MaskWriteShift and generate the first output pointer FifoOut1<D:0> on the basis of the mask write shift instruction MaskWriteShift.

In some embodiments, referring to FIG. 3, the first input control circuit 201 includes a first data receiving subcircuit 202 and a first write pointer generation subcircuit 203.

The first data receiving subcircuit 202 is configured to receive the mask write instruction MaskWrite and configured to generate the first pointer generation command when receiving the mask write instruction MaskWrite. The first write pointer generation subcircuit 203 is configured to receive the first pointer generation command and generate the first write pointer CntIn1<C:0> on the basis of the first pointer generation command, the first write pointer CntIn1<C:0> being configured to give an instruction of storing the pointer to be positioned Cnt<E:0> into the first cache circuit 101.

In some embodiments, referring to FIG. 3, the first output control circuit 301 includes a second data receiving subcircuit 302 and a first output pointer generation subcircuit 303.

The second data receiving subcircuit 302 is configured to receive the mask write shift instruction MaskWriteShift and configured to generate the first pointer output command when receiving the mask write shift instruction MaskWriteShift. The first output pointer generation subcircuit 303 is configured to receive the first pointer output command and generate the first output pointer FifoOut1<D:0> on the basis of the first pointer output command, the first output pointer FifoOut1<D:0> being configured to instruct the first cache circuit 101 to output the positioned pointer Out0<F:0>.

Referring to FIG. 3 and FIG. 2, in some embodiments, the second control subcircuit 123 includes a second input control circuit 401 and a second output control circuit 501.

The second input control circuit 401 is configured to receive the write command, generate the second write pointer CntIn2<A:0> according to the write command, and generate, according to the mask write instruction MaskWrite, the pointer to be positioned Cnt<E:0> when the write command is the mask write instruction MaskWrite. The second output control circuit 501 is configured to receive the write shift instruction WriteShift and generate the second output pointer FifoOut2<B:0> according to the write shift instruction WriteShift. Since the write command includes the write instruction Write and the mask write instruction MaskWrite, the second input control circuit 401 needs to generate the second write pointer CntIn2<A:0> regardless of whether the write instruction Write or the mask write instruction MaskWrite is received. In some embodiments, the write instruction Write and the mask write instruction MaskWrite may be received through a logical OR gate, and the write command is outputted from an output terminal of the logical OR gate.

In some embodiments, referring to FIG. 3, the second input control circuit 401 includes a third data receiving subcircuit 402, a second write pointer generation subcircuit 403, and a data acquisition subcircuit 404.

The third data receiving subcircuit 402 is configured to receive the write command and configured to generate the second pointer generation command when receiving the write command. The second write pointer generation subcircuit 403 is configured to receive the second pointer generation command and generate the second write pointer CntIn2<A:0> on the basis of the second pointer generation command, the second write pointer CntIn2<A:0> being configured to give an instruction of storing the write address Address into the second cache circuit. The data acquisition subcircuit 404 is configured to receive the mask write instruction MaskWrite and generate, on the basis of the mask write instruction MaskWrite, the pointer to be positioned Cnt<E:0>.

In some embodiments, referring to FIG. 3, the second output control circuit 501 includes a fourth data receiving subcircuit 502 and a second output pointer generation subcircuit 503.

The fourth data receiving subcircuit 502 is configured to receive the write shift instruction WriteShift and configured to generate the second pointer output command when receiving the write shift instruction WriteShift. The second output pointer generation subcircuit 503 is configured to receive the second pointer output command and generate the second output pointer FifoOut2<B:0> on the basis of the second pointer output command, the second output pointer FifoOut2<B:0> being configured to instruct the second cache circuit 102 to output the write address Address.

The first data receiving subcircuit 202, the second data receiving subcircuit 302, the third data receiving subcircuit 402, and the fourth data receiving subcircuit 502 are internally provided with counters having the same drive clock frequency for keeping the input data and the output data of the second cache circuit 102 at a consistent transmission rate, thereby achieving first-in-first-out of the data.

Referring to FIG. 4 and FIG. 1 to FIG. 3, the second cache circuit 102 (referring to FIG. 1) includes a first cache circuit 601, a first drive circuit 602, a second drive circuit 603, and a first latch circuit 604.

The first cache circuit 601 is configured to cache the write address Address. The first drive circuit 602 is connected to the first cache circuit 601, is configured to receive the second output pointer FifoOut2<B:0>, and is turned on according to the second output pointer FifoOut2<B:0> to successively output the write address Address cached in the first cache circuit 601. The second drive circuit 603 is connected to the first cache circuit 601, is configured to receive the positioned pointer Out0<F:0>, and is turned on according to the positioned pointer Out0<F:0> to selectively output the write address Address cached in the first cache circuit 601. The first latch circuit 604 is connected to the first drive circuit 602 and the second drive circuit 603, and is configured to maintain an output voltage of the first drive circuit 602 or an output level of the second drive circuit 603. With reference to the above description of the second cache circuit 102 (referring to FIG. 1), the first drive circuit 602 is configured to respond to the output of the write shift instruction WriteShift, and the second drive circuit 603 is configured to respond to the output of the mask write shift instruction MaskWriteShift.

In one example, the first cache circuit 601 includes a plurality of first D flip-flops, and each of the first D flip-flops is configured to store the write address Address of a preset width. The width of the write address Address is limited according to the width of the address needing to be stored, and the embodiments of the present disclosure do not constitute a limitation on the storage width of the first D flip-flops.

In some embodiments, each of the first D flip-flops includes a preset width of sub-flip-flops, where each of the sub-flip-flops is configured to store 1-bit data.

In one example, the first drive circuit 602 includes: a first driver provided with an input terminal connected to the first cache circuit 601 and an output terminal connected to the first latch circuit 604; and a receiving subcircuit connected to the control circuit 103 (referring to FIG. 1), and configured to receive the second output pointer FifoOut2<B:0> and turn on the first driver on the basis of the second output pointer FifoOut2<B:0>. The first driver outputs the stored data in the first cache circuit 601 under the driving of the second output pointer FifoOut2<B:0>.

In one example, the second drive circuit 603 includes: a second driver provided with an input terminal connected to an output terminal of the first cache circuit 601 and an output terminal connected to an input terminal of the first latch circuit 604; and a receiving subcircuit connected to the control circuit 103 (referring to FIG. 1), and configured to receive the positioned pointer Out0<F:0> and turn on the second driver on the basis of the positioned pointer Out0<F:0>. The second driver outputs the stored data in the first cache circuit 601 under the driving of the positioned pointer Out0<F:0>.

The first latch circuit 604 is configured to cache the data outputted by the first drive circuit 602 and the second drive circuit 603. In one example, the first latch circuit 604 includes a first inverter and a second inverter. An output terminal of the first inverter is connected to an input terminal of the second inverter, and an output terminal of the second inverter is connected to an input terminal of the first inverter. That is, two stages of inverters are connected end to end to constitute a latch. In other embodiments, another latch may also be used as the first latch circuit.

Referring to FIG. 5 and FIG. 1 to FIG. 3, the first cache circuit 101 (referring to FIG. 1) includes a second cache circuit 701, a third drive circuit 702, and a second latch circuit 703.

The second cache circuit 701 is configured to cache the pointer to be positioned Cnt<E:0>. The third drive circuit 702 is connected to an output terminal of the second cache circuit 701, is configured to receive the first output pointer FifoOut1<D:0>, and is turned on according to the first output pointer FifoOut1<D:0> to output the pointer to be positioned Cnt<E:0> cached in the second cache circuit 701. The second latch circuit 703 is connected to the third drive circuit 702, and is configured to maintain an output level of the third drive circuit 702. In combination with the above description of the first cache circuit 101 (referring to FIG. 1), the third drive circuit 702 is configured to output, in response to the mask write shift instruction MaskWriteShift, the positioned pointer Out0<F:0> to control the second cache circuit 102 to output the real mask write address MaskWriteAddress.

In one example, the second cache circuit 701 includes a plurality of second D flip-flops, and each of the second D flip-flops is configured to store the write address Address of a preset width. The width of the write address Address is limited according to the width of the address needing to be stored, and the embodiments of the present disclosure do not constitute a limitation on the storage width of the second D flip-flops. For example, each of the second D flip-flops includes a preset width of sub-flip-flops, and each of the sub-flip-flops is configured to store 1-bit data.

In one example, the third drive circuit 702 includes: a third driver provided with an input terminal connected to an output terminal of the second cache circuit 701 and an output terminal connected to the second latch circuit 703; and a third receiving subcircuit connected to the control circuit 103 (referring to FIG. 1), and configured to receive the first output pointer FifoOut1<D:0> and turn on the third driver on the basis of the first output pointer FifoOut1<D:0>.

The second latch circuit 703 is configured to cache the data outputted by the third drive circuit 702. In one example, the second latch circuit 703 includes a third inverter and a fourth inverter. An output terminal of the third inverter is connected to an input terminal of the fourth inverter, and an output terminal of the fourth inverter is connected to an input terminal of the third inverter. That is, two stages of inverters are connected end to end to constitute a latch. In other embodiments, another latch may also be used as the second latch circuit.

The write cache circuit provided by the present disclosure saves one storage space by storing the data of the write operation and the data of the mask write operation into the storage space. In addition, a location storage space configured to store the address corresponding to the mask write operation is newly added, and the number of data pieces stored in the location storage space is not greater than the number of data pieces configured to store the write address (the reason is that: the data stored in the write address includes write data and mask write data; in extreme cases, the write data are all the mask write data, and at this time, the number of data pieces stored in the location storage space is equal to the number of data pieces stored in the address storage space). That is, the capacity of the newly added storage space is smaller than the capacity of the saved storage space, thereby reducing the layout area of the write cache circuit in practical applications.

On the basis of the write cache circuit provided in the above embodiment, another embodiment of the present disclosure provides a data write method, including the following steps:

write, on the basis of a write command, a write address corresponding to the write command into a second cache circuit, the write command being one of a write instruction and a mask write instruction;

write, on the basis of the mask write instruction, a pointer to be positioned into a first cache circuit, the pointer to be positioned being configured to give an instruction of writing the write address of the second cache circuit on the basis of the mask write instruction; and successively read, on the basis of a write shift instruction, the write address stored in the second cache circuit, or selectively read, on the basis of a mask write shift instruction, the write address stored in the second cache circuit through the pointer to be positioned in the first cache circuit.

In some embodiments, the step of successively reading, on the basis of a write shift instruction, the write address stored in the second cache circuit includes: acquire a second output pointer on the basis of the write shift instruction; and successively read, on the basis of the second output pointer, the write address stored in the second cache circuit.

In some embodiments, the step of selectively reading, on the basis of a mask write shift instruction, the write address stored in the second cache circuit through the pointer to be positioned in the first cache circuit includes: acquire a first output pointer on the basis of a mask write shift instruction; successively read a positioned pointer on the basis of the first output pointer, the positioned pointer being the pointer to be positioned that is stored in the first cache circuit; and selectively read, on the basis of the positioned pointer, the write address stored in the second cache circuit.

It should be noted that the descriptions on the data write method are similar to those on the write cache circuit in the above embodiment. Therefore, the similar beneficial effects as the write cache circuit in the above embodiment are achieved and will not be repeated herein. Technical details not disclosed in the data write method in the embodiment of the present disclosure are understood with reference to the descriptions on the write cache circuit in the above embodiment of the present disclosure.

Another embodiment of the present disclosure further provides a memory, including the write cache circuit according to the above embodiment. The memory provided in the present disclosure includes, but is not limited to, a dynamic random access memory (DRAM), etc. The memory adopts the write cache circuit according to the above embodiment to reduce the layout area of the write circuit in practical applications.

In some embodiments, the memory is a DRAM chip, where the memory of the DRAM chip conforms to the double data rate 2 (DDR2) memory specification.

In some embodiments, the memory is a DRAM chip provided with memory meeting a DDR3 memory specification.

In some embodiments, the memory is a DRAM chip provided with memory meeting a DDR4 memory specification.

In some embodiments, the memory is a DRAM chip provided with memory meeting a DDR5 memory specification.

The embodiments or implementations of this specification are described in a progressive manner, and each embodiment focuses on differences from other embodiments. The same or similar parts between the embodiments may refer to each other.

In the description of this specification, the description with reference to terms such as "an embodiment", "an exemplary embodiment", "some implementations", "a schematic implementation", and "an example" means that the specific feature, structure, material, or characteristic described in combination with the implementation(s) or example(s) is included in at least one implementation or example of the present disclosure.

In this specification, the schematic expression of the above terms does not necessarily refer to the same implementation or example. Moreover, the described specific feature, structure, material or characteristic may be combined in an appropriate manner in any one or more implementations or examples.

It should be noted that in the description of the present disclosure, the terms such as "center", "top", "bottom", "left", "right", "vertical", "horizontal", "inner" and "outer" indicate the orientation or position relationships based on the accompanying drawings. These terms are merely intended to facilitate description of the present disclosure and simplify the description, rather than to indicate or imply that the mentioned apparatus or element must have a specific orientation and must be constructed and operated in a specific orientation. Therefore, these terms should not be construed as a limitation to the present disclosure.

It can be understood that the terms such as "first" and "second" used in the present disclosure can be used to describe various structures, but these structures are not limited by these terms. Instead, these terms are merely intended to distinguish one structure from another.

The same elements in one or more accompanying drawings are denoted by similar reference numerals. For the sake of clarity, various parts in the accompanying drawings are not drawn to scale. In addition, some well-known parts may not be shown. For the sake of brevity, a structure obtained by implementing a plurality of steps may be shown in one figure. In order to understand the present disclosure more clearly, many specific details of the present disclosure, such as the structure, material, size, processing process, and technology of the device, are described below. However, as those skilled in the art can understand, the present disclosure may not be implemented according to these specific details.

Finally, it should be noted that the above embodiments are merely intended to explain the technical solutions of the present disclosure, rather than to limit the present disclosure. Although the present disclosure is described in detail with reference to the above embodiments, those skilled in the art should understand that they may still modify the technical solutions described in the above embodiments, or make equivalent substitutions of some or all of the technical features recorded therein, without deviating the essence of the corresponding technical solutions from the scope of the technical solutions of the embodiments of the present disclosure.

INDUSTRIAL APPLICABILITY

In the write cache circuit, the data write method, and the memory provided in the embodiments of the present disclosure, the write cache circuit saves one storage space by storing the data of the write operation and the data of the mask write operation into the storage space. In addition, a location storage space configured to store the address corresponding to the mask write operation is newly added, and the number of data pieces stored in the location storage space is not greater than the number of data pieces configured to store the write address. That is, the capacity of the newly added storage space is smaller than the capacity of the saved storage space, thereby reducing the layout area of the write cache circuit in practical applications.

The invention claimed is:

1. A write cache circuit, comprising:
a control circuit configured to generate, on the basis of a mask write instruction, a first write pointer and a pointer to be positioned, generate a second write pointer on the basis of a write command, generate a first output pointer on the basis of a mask write shift instruction, and generate a second output pointer on the basis of a write shift instruction; wherein, the write command is one of a write instruction and the mask write instruction, and the pointer to be positioned and the second write pointer generated on the basis of the mask write instruction correspond to a same write address;
a first cache circuit configured to cache data in a queue, cache, on the basis of the first write pointer, the pointer to be positioned, and output a positioned pointer on the basis of the first output pointer; wherein, the positioned pointer is the pointer to be positioned that is cached in the first cache circuit, and is configured to instruct a second cache circuit to output the write address written by the second write pointer generated according to the mask write instruction; and
the second cache circuit configured to cache the data in a queue, cache the write address on the basis of the second write pointer, and output the cached write address on the basis of the second output pointer or the positioned pointer.

2. The write cache circuit according to claim 1, wherein the first cache circuit is shallower than the second cache circuit.

3. The write cache circuit according to claim 1, wherein the control circuit comprises:
a first control subcircuit configured to generate the first write pointer on the basis of the mask write instruction and generate the first output pointer on the basis of the mask write shift instruction; and
a second control subcircuit configured to generate the second write pointer on the basis of the write command, generate the second output pointer on the basis of the write shift instruction, and further generate, on the basis of the mask write instruction, the pointer to be positioned.

4. The write cache circuit according to claim 3, wherein the first control subcircuit comprises:
a first input control circuit configured to receive the mask write instruction and generate the first write pointer according to the mask write instruction; and
a first output control circuit configured to receive the mask write shift instruction and generate the first output pointer on the basis of the mask write shift instruction.

5. The write cache circuit according to claim 4, wherein the first input control circuit comprises:
a first data receiving subcircuit configured to receive the mask write instruction and configured to generate a first pointer generation command when receiving the mask write instruction; and
a first write pointer generation subcircuit configured to receive the first pointer generation command and generate the first write pointer on the basis of the first pointer generation command, the first write pointer being configured to give an instruction of storing the pointer to be positioned into the first cache circuit.

6. The write cache circuit according to claim 4, wherein the first output control circuit comprises:
a second data receiving subcircuit configured to receive the mask write shift instruction and configured to generate a first pointer output command when receiving the mask write shift instruction; and
a first output pointer generation subcircuit configured to receive the first pointer output command and generate the first output pointer on the basis of the first pointer output command, the first output pointer being configured to instruct the first cache circuit to output the positioned pointer.

7. The write cache circuit according to claim 3, wherein the second control subcircuit comprises:
a second input control circuit configured to receive the write command, generate the second write pointer according to the write command, and generate, according to the mask write instruction, the pointer to be positioned when the write command is the mask write instruction; and
a second output control circuit configured to receive the write shift instruction and generate the second output pointer according to the write shift instruction.

8. The write cache circuit according to claim 7, wherein the second input control circuit comprises:
a third data receiving subcircuit configured to receive the write command and configured to generate a second pointer generation command when receiving the write command;
a second write pointer generation subcircuit configured to receive the second pointer generation command and generate the second write pointer on the basis of the second pointer generation command, the second write pointer being configured to give an instruction of storing the write address into the second cache circuit; and a data acquisition subcircuit configured to receive the mask write instruction and generate, on the basis of the mask write instruction, the pointer to be positioned.

9. The write cache circuit according to claim 7, wherein the second output control circuit comprises:

a fourth data receiving subcircuit configured to receive the write shift instruction and configured to generate a second pointer output command when receiving the write shift instruction; and a second output pointer generation subcircuit configured to receive the second pointer output command and generate the second output pointer on the basis of the second pointer output command, the second output pointer being configured to instruct the second cache circuit to output the write address.

10. The write cache circuit according to claim 1, wherein the second cache circuit comprises:

a first cache circuit configured to cache the write address;

a first drive circuit connected to the first cache circuit, configured to receive the second output pointer and to be turned on according to the second output pointer to successively output the write address cached in the first cache circuit;

a second drive circuit connected to the first cache circuit, configured to receive the positioned pointer and to be turned on according to the positioned pointer to selectively output the write address cached in the first cache circuit; and a first latch circuit connected to the first drive circuit and the second drive circuit and configured to maintain an output voltage of the first drive circuit or an output level of the second drive circuit.

11. The write cache circuit according to claim 10, wherein the first cache circuit comprises a plurality of first D flip-flops, and each of the first D flip-flops is configured to store the write address of a preset width.

12. The write cache circuit according to claim 10, wherein the first drive circuit comprises:

a first driver provided with an input terminal connected to the first cache circuit and an output terminal connected to the first latch circuit; and a receiving subcircuit connected to the control circuit, and configured to receive the second output pointer and turn on the first driver on the basis of the second output pointer.

13. The write cache circuit according to claim 10, wherein the first latch circuit comprises a first inverter and a second inverter, wherein an output terminal of the first inverter is connected to an input terminal of the second inverter, and an output terminal of the second inverter is connected to an input terminal of the first inverter.

14. The write cache circuit according to claim 1, wherein the first cache circuit comprises:

a second cache circuit configured to cache the pointer to be positioned;

a third drive circuit connected to the second cache circuit, configured to receive the first output pointer and to be turned on according to the first output pointer to output the pointer to be positioned that is cached in the second cache circuit; and a second latch circuit connected to the third drive circuit and configured to maintain an output level of the third drive circuit.

15. The write cache circuit according to claim 14, wherein the second cache circuit comprises a plurality of second D flip-flops, and each of the second D flip-flops is configured to store the output pointer of a preset width.

16. A data write method, applied to the write cache circuit according to claim 1, wherein the data write method comprises:

writing, on the basis of a write command, a write address corresponding to the write command into a second cache circuit, the write command being one of a write instruction and a mask write instruction;

writing, on the basis of the mask write instruction, a pointer to be positioned into a first cache circuit, the pointer to be positioned being configured to give an instruction of writing the write address of the second cache circuit on the basis of the mask write instruction; and successively reading, on the basis of a write shift instruction, the write address stored in the second cache circuit, or selectively reading, on the basis of a mask write shift instruction, the write address stored in the second cache circuit through the pointer to be positioned in the first cache circuit.

17. The data write method according to claim 16, wherein the successively reading, on the basis of a write shift instruction, the write address stored in the second cache circuit comprises: acquiring a second output pointer on the basis of the write shift instruction; and successively reading, on the basis of the second output pointer, the write address stored in the second cache circuit.

18. The data write method according to claim 16, wherein the selectively reading, on the basis of a mask write shift instruction, the write address stored in the second cache circuit through the pointer to be positioned in the first cache circuit comprises: acquiring a first output pointer on the basis of a mask write shift instruction; successively reading a positioned pointer on the basis of the first output pointer, the positioned pointer being the pointer to be positioned that is stored in the first cache circuit; and selectively reading, on the basis of the positioned pointer, the write address stored in the second cache circuit.

19. A memory, comprising the write cache circuit according to claim 1.

* * * * *